United States Patent
Reiter, Jr. et al.

(10) Patent No.: US 6,675,460 B2
(45) Date of Patent: Jan. 13, 2004

(54) METHOD OF MAKING A POWDER METAL ROTOR FOR A SYNCHRONOUS RELUCTANCE MACHINE

(75) Inventors: Frederick B. Reiter, Jr., Cicero, IN (US); Tom L. Stuart, Pendleton, IN (US); Scott M. Clase, Indianapolis, IN (US); Bradley D. Beard, Yorktown, IN (US)

(73) Assignee: Delphi Technologies, Inc., Troy, MI (US)

(*) Notice: Subject to any disclaimer, the term of this patent is extended or adjusted under 35 U.S.C. 154(b) by 74 days.

(21) Appl. No.: 09/970,230

(22) Filed: Oct. 3, 2001

(65) Prior Publication Data

US 2003/0062791 A1 Apr. 3, 2003

(51) Int. Cl.[7] ............................................. H02K 15/16
(52) U.S. Cl. ........................... 29/596; 29/598; 29/597; 29/607; 29/608; 310/154.01; 148/514
(58) Field of Search .................. 29/596, 598, 597, 29/607, 608; 310/156.38, 156.43, 156.45, 154.01, 156.44, 156.48, 156.53, 156.56; 148/513, 514; 419/6, 38; 427/180, 226, 383.1, 127, 131

(56) References Cited

U.S. PATENT DOCUMENTS

| | | | |
|---|---|---|---|
| 3,780,418 A | 12/1973 | Hurst | 29/420 |
| 3,864,154 A | 2/1975 | Gazza et al. | 29/123 B |
| RE28,866 E * | 6/1976 | Haefele et al. | 427/127 |
| 4,419,413 A | 12/1983 | Ebihara | 428/548 |
| 4,602,956 A | 7/1986 | Partlow et al. | 75/235 |
| 4,713,215 A | 12/1987 | Madsac | 419/8 |
| 5,010,266 A | 4/1991 | Uchida | 310/156 |
| 5,043,123 A | 8/1991 | Gormanns et al. | 264/113 |
| 5,069,866 A | 12/1991 | Ekbom | 419/6 |
| 5,091,022 A | 2/1992 | Achikita et al. | 148/104 |
| 5,191,256 A | 3/1993 | Reiter, Jr. et al. | 310/156 |
| 5,296,773 A | 3/1994 | El-Antably et al. | 310/261 |
| 5,371,426 A | 12/1994 | Nagate et al. | 310/156 |
| 5,576,075 A * | 11/1996 | Kawasaki et al. | 427/565 |
| 5,666,632 A | 9/1997 | Maulik | 419/6 |
| 5,684,352 A | 11/1997 | Mita et al. | 310/156 |
| 5,701,943 A | 12/1997 | Young | 164/97 |
| 5,722,032 A * | 2/1998 | Gay | 419/6 |
| 5,818,140 A | 10/1998 | Vagati | 310/185 |
| 5,820,963 A * | 10/1998 | Lu et al. | 428/653 |
| 5,822,839 A * | 10/1998 | Ghosh et al. | 29/596 |
| 5,841,212 A * | 11/1998 | Mita et al. | 310/156.56 |
| 5,935,722 A | 8/1999 | Moorhead et al. | 428/694 B |
| 5,948,550 A * | 9/1999 | Fujii et al. | 428/680 |
| 5,993,733 A | 11/1999 | Kawai | 419/48 |
| 6,064,134 A | 5/2000 | El-Antably et al. | 310/261 |
| 6,066,904 A | 5/2000 | Fei et al. | 310/168 |
| 6,203,752 B1 | 3/2001 | Bewlay et al. | 419/6 |
| 6,208,054 B1 | 3/2001 | Tajima et al. | 310/156 |
| 6,287,513 B1 | 9/2001 | Grady et al. | 419/37 |
| 6,331,214 B1 | 12/2001 | Koga et al. | 148/101 |
| 6,392,324 B1 | 5/2002 | Kuwahara | 310/156.11 |

FOREIGN PATENT DOCUMENTS

| | | | |
|---|---|---|---|
| JP | 8-340666 | 12/1996 | H02K/19/14 |

* cited by examiner

Primary Examiner—A. Dexter Tugbang
Assistant Examiner—Tai Nguyen
(74) Attorney, Agent, or Firm—Jimmy L. Funke (57) ABSTRACT

A method of making a composite powder metal disk for a rotor assembly in a synchronous reluctance machine. The method includes filling discrete regions of a disk-shaped die with ferromagnetic and non-ferromagnetic powder metals, compacting to powders, and sintering the compacted powders. By this method, a disk is formed that includes alternating regions of magnetically conducting powder metal and magnetically non-conducting powder metal compacted and sintered to a high density. The method may also include forming a rotor assembly by stacking a plurality of the composite powder metal disks axially along a shaft with their magnetic configurations aligned.

35 Claims, 7 Drawing Sheets

METHOD OF MAKING A POWDER METAL ROTOR FOR A SYNCHRONOUS RELUCTANCE MACHINE

FIELD OF THE INVENTION

This invention relates generally to synchronous speed reluctance machines, and more particularly, to the manufacture of rotors for a reluctance type machine.

BACKGROUND OF THE INVENTION

It is to be understood that the present invention relates to generators as well as to motors, however, to simplify the description that follows, a motor will be described with the understanding that the invention also relates to generators. With this understanding, a synchronous reluctance motor is a synchronous machine having a stator with poly-phase windings forming a plurality of poles that are similar to those of induction motors. The synchronous reluctance motor further includes a rotor that does not use windings or permanent magnets, but does have the same number of poles as the stator. By providing a rotating field in the stator windings, a magnetomotive force acts upon the rotor resulting in the rotor being driven at a synchronous speed proportional to the rotating field in the stator.

Synchronous reluctance rotors typically include a plurality of rotor sections formed of stacked alternating magnetic and non-magnetic laminations secured to a unitary core. The core has a central axial bore for receiving a shaft. The laminations are inserted between radially extending arms of the core, which are formed with a smooth, arcuate recess there between. The laminations are secured in the recesses by means of radial fasteners that secure radially-opposing rotor sections to the core. The rotor sections are also secured together by end caps and axial fasteners. The end caps are cup-shaped members with an axially extending outer rim disposed about the outermost periphery of the laminations. The axial fasteners extend through the end caps and core to secure the end caps to the rotor. The rotor laminations may also be bonded to one another and to the core using an epoxy or other adhesive material. A full description of the laminated stack type synchronous reluctance rotors is disclosed in U.S. Pat. No. 5,296,773.

Methods of building rotors for synchronous reluctance machines include stacked axial laminations and stamped radial laminations. Stacked axial lamination synchronous reluctance rotors are structurally weak due to problems associated both with the fastening and with shifting of the laminations during operation of their many circumferentially discontinuous components. This results in a drastically lower top speed. Moreover, the individual lamination segments have to be independently fabricated and meticulously assembled in a time consuming and costly process. Stamped radial laminations require structural support material at the ends and in the middle of magnetic insulation slots. This results in both structural weakness due to the small slot supports and reduced output power due to magnetic flux leakage through the slot supports. Radial laminations also have a substantially lower top speed than comparably sized induction motors.

There is thus a need to develop a synchronous reluctance machine that exhibits high power density and efficiency and high speed rotating capability similar or better than that of comparably sized induction motors, and preferably that may be produced at a lower cost than that of induction motors.

SUMMARY OF THE INVENTION

The present invention provides a composite powder metal disk for a rotor assembly in a synchronous reluctance machine, the disk having alternating regions of magnetically conducting powder metal and magnetically non-conducting powder metal compacted and sintered to a high density. In a further embodiment, a rotor assembly is provided having a plurality of the composite powder metal disks axially stacked along and mounted to a shaft. There is further provided a method of making such a composite powder metal disk and rotor assembly in which a die is filled according to the desired alternating magnetic pattern, followed by pressing the powder metal and sintering the compacted powder to achieve a high density composite powder metal disk of high structural stability. These disks are then stacked axially along a shaft with their magnetic patterns aligned to form the powder metal rotor assembly. A synchronous reluctance machine incorporating the powder metal rotor assembly of the present invention exhibits power density and efficiency comparable to induction motors and improved high speed rotating capability, yet may be produced at a lower cost.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

The present invention provides composite powder metal rotor components for rotor assemblies in synchronous reluctance machines. Synchronous reluctance machines incorporating the composite powder metal components exhibit high power density and efficiency and high speed rotating capability. To this end, and in accordance with the principles of the present invention, a plurality of powder metal disks or laminations are fabricated to comprise one or more magnetically conducting segments and one or more magnetically non-conducting segments in alternating relation to each other. The magnetically conducting segments comprise a pressed and sintered soft ferromagnetic powder metal, and the magnetically non-conducting segments comprise a pressed and sintered non-ferromagnetic powder metal. In an embodiment of the present invention, the soft ferromagnetic powder metal is nickel, iron, cobalt or an alloy thereof. In another embodiment of the present invention, this soft ferromagnetic metal is a low carbon steel or a high purity iron powder with a minor addition of phosphorus, such as covered by MPIF (Metal Powder Industry Federation) Standard 35 F-0000, which contains approximately 0.27% phosphorus. In general, AISI 400 series stainless steels are magnetically conducting, and may be used in the present invention. In an embodiment of the present invention, the non-ferromagnetic powder metal is austenitic stainless steel, such as SS316. In general, the AISI 300 series stainless steels are non-magnetic and may be used in the present invention. Also, the AISI 8000 series steels are non-magnetic and may be used. In an embodiment of the present invention, the ferromagnetic and non-ferromagnetic materials are chosen so as to have similar densities and sintering temperatures, and are approximately of the same strength, such that upon compaction and sintering, the materials behave in a similar fashion. In an embodiment of the present invention, the soft ferromagnetic powder metal is Fe-0.27%P and the non-ferromagnetic powder metal is SS316.

The powder metal disks of the present invention typically exhibit magnetically conducting segments having at least about 95% of theoretical density, and typically between about 95%–98% of theoretical density. Wrought steel or iron has a theoretical density of about 7.85 gms/cm$^3$, and thus, the magnetically conducting segments exhibit a density of around 7.46–7.69 gms/cm$^3$. The non-conducting segments of the powder metal disks of the present invention exhibit a density of at least about 85% of theoretical density, which is on the order of about 6.7 gms/cm$^3$. Thus, the non-ferromagnetic powder metals are less compactible then the ferromagnetic powder metals.

The powder metal disks or rings can essentially be of any thickness. These disks are aligned axially along a shaft and mounted to the shaft to form a rotor assembly. The shaft is typically equipped with a key and the individual disks have a keyway on an interior surface to mount the disks to the shaft upon pressing the part to the shaft. In an embodiment of the present invention, the individual disks or rings have a thickness on the order of about ½ to ⅜ inches. As disk thicknesses increase, the boundaries between the powder metal conducting segments and powder metal non-conducting segments may begin to blur. In practice, up to 13 disks of the present invention having a ½–⅜ inch thickness are suitable for forming a rotor assembly. The individual disks are aligned with respect to each other along the shaft such that the magnetic flux paths are aligned along the shaft. The non-ferromagnetic powder metal acts as an insulator between the aligned flux paths comprised of the ferromagnetic powder metal segments. This arrangement allows better direction of magnetic flux and improves the torque of the rotor assembly. The magnetic flux between insulating sections provides motor poles at the rotor surface, and therefore the stacked disks are aligned relative to that pattern. There is no limit on the number of poles other than there must be two poles minimum for the rotor assembly, and there should be an even number of poles in total. There is no limit to the thickness of each disk or the number of disks that may be utilized to construct a rotor assembly. There is no limit to the number of magnetically conducting segments or non-magnetically conducting segments or their widths relative to each other, other than there must be at least one conducting segment and one non-conducting segment per pole.

Figures 1, 1A:
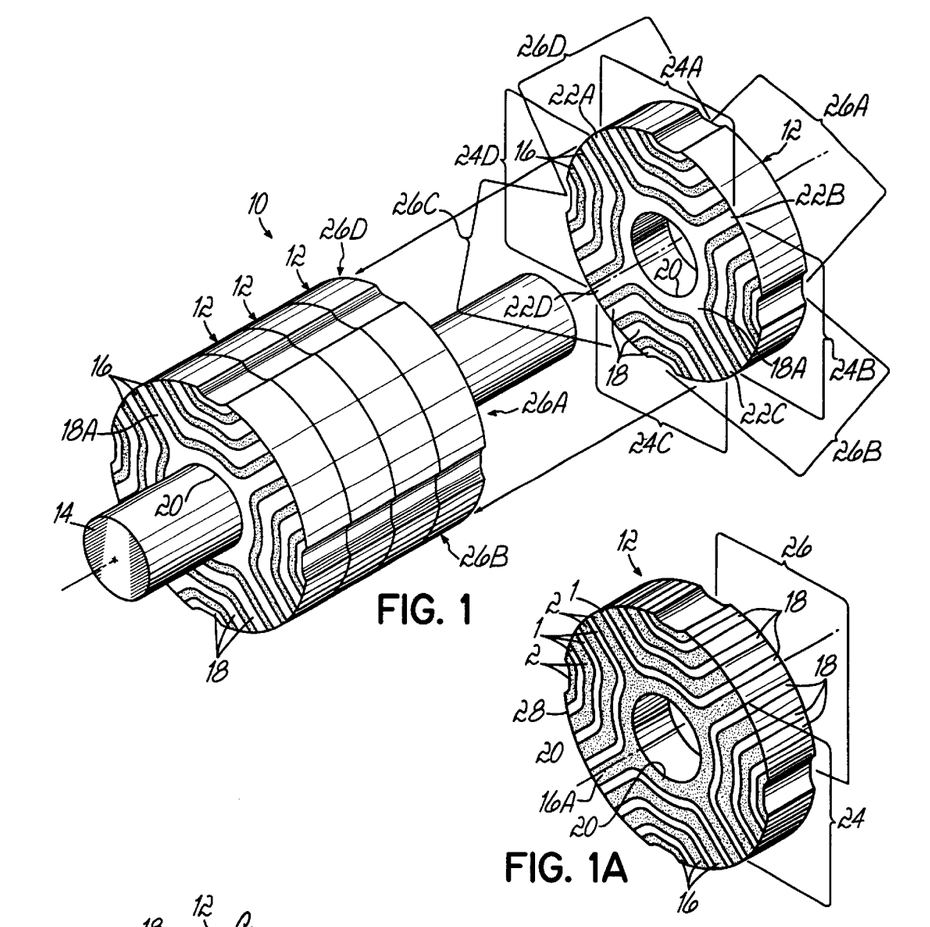
FIG. 1 is a partially disassembled perspective view of a powder metal rotor assembly of the present invention having a plurality of disks stacked along a shaft, each having a plurality of alternating magnetically conducting and non-conducting segments.
FIG. 1A is a perspective view of disk similar to the disk depicted in FIG. 1, but with an opposite alternating pattern of magnetically conducting and non-conducting segments.

With reference to the Figures in which like numerals are used throughout to represent like parts, FIG. 1 depicts in a partially disassembled perspective view a powder metal rotor assembly 10 of the present invention having a plurality of powder metal composite disks 12 stacked along a shaft 14, each disk 12 having a plurality of alternating magnetically conducting segments 16 and non-conducting segments 18 aligned from one disk 12 to another along the length of the shaft 14. In the particular embodiment of FIG. 1, the segment 18A adjacent the interior surface 20 of the disk 12 is a non-conducting segment 18. This segment 18A essentially forms four equiangular spaced, radially extending arm portions 22A–D that define axially extending channels 24A–D there between. Within those channels are alternating layers of magnetically conducting segments 16 and magnetically non-conducting segments 18. The poles 26A–D of the rotor assembly 10 extend from the center of one channel 24 to the center of an adjacent channel 24. Thus, each magnetically conducting segment 16 conducts magnetic flux from one pole 26A–D to the next.

FIG. 1A depicts a disk 12 similar in magnetic configuration to that depicted in FIG. 1. Specifically, the segment 16A adjacent the interior surface 20 of the disk 12 is a conducting segment 16, and within each channel 24 are alternating layers of magnetically non-conducting segments 18 and magnetically conducting segments 16.

Figure 2:
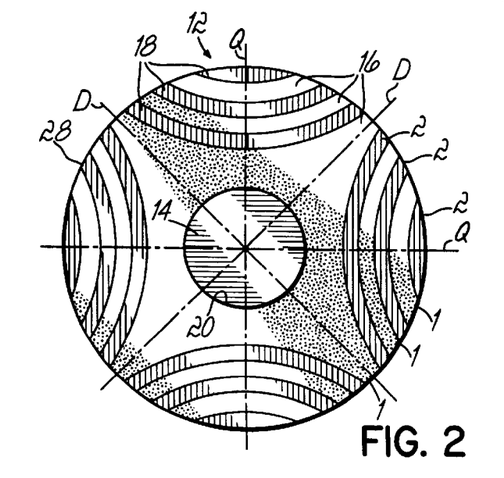
FIG. 2 is a plan view of a four-pole powder metal rotor assembly of the present invention having a plurality of arcuate magnetically conducting and non-conducting segments.

In FIG. 2, the composite powder metal disk 12 is similar to that in FIG. 1, but the segments 16,18 are generally arcuate in shape. FIG. 2 further depicts the direct axes D upon which the poles 26 are aligned and the quadrature axes Q. To further illustrate the present invention, the disk 12 may be said to comprise alternating regions 1 and 2. In general, regions 1 can be magnetically conducting or magnetically non-conducting. The embodiment depicted in FIG. 2 shows regions 1 as being magnetically conducting regions. Regions 2 can be magnetically conducting or magnetically non-conducting, providing they are opposite in conduction capability to that of regions 1. Thus, in the embodiment depicted in FIG. 2, regions 2 are magnetically non-conducting. If regions 2 are magnetically flux conducting as depicted in FIG. 1A, the outermost of regions 2 should not extend fully to the exterior rotor surface 28, but rather are "scalloped" at the rotor surface 28 centered on the quadrature axes Q. This scalloping prevents excessive magnetic flux leakage through the quadrature axis Q. A synchronous reluctance machine's ability to generate torque and power depends on maintaining a large saliency ratio of 6–10:1. The saliency ratio is the ability of a synchronous reluctance machine to conduct magnetic flux in the direct axis D compared to the quadrature axis Q. If there is a large amount of flux conducting material in the quadrature axis Q. it diminishes the ability of the synchronous reluctance machine to produce torque by virtue of providing an easy flux leakage path through the quadrature axis Q. If regions 2 are non-flux conducting, as in FIG. 2, it is no detriment for the outermost of regions 2 to extend completely to the rotor surface 28, although scalloping may be used, as in FIG. 1.

Figure 3:
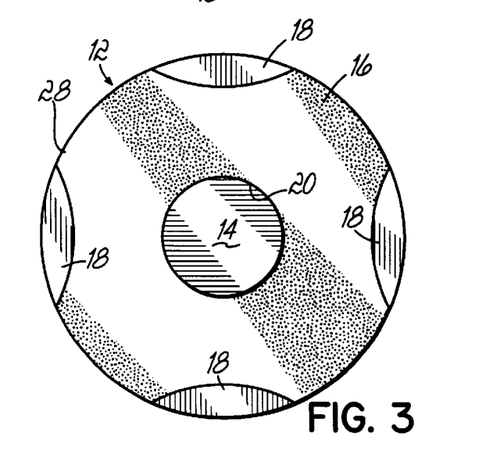
FIG. 3 is a four-pole powder metal rotor assembly of the present invention having a single magnetically conducting segment and four non-conducting segments.

FIG. 3 depicts another embodiment of a disk 12 of the present invention in which the disk 12 has one magnetically conducting segment 16 adjacent the interior circumferential surface 20 of the composite powder metal disk 12, and four circumferentially equally spaced magnetically non-conducting segments 18 adjacent the exterior circumferential surface 28 of the disk 12.

Figure 4:
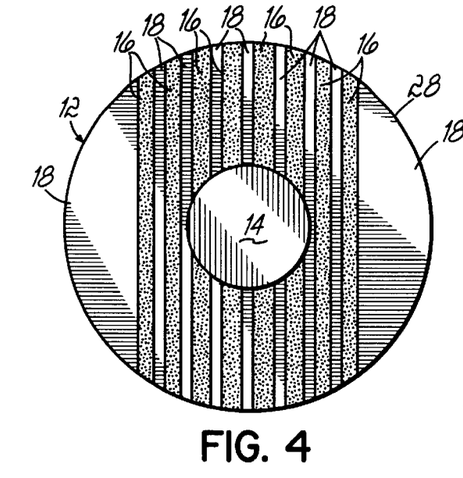
FIG. 4 is a two-pole powder metal rotor assembly of the present invention having a plurality of alternating magnetically conducting and non-conducting segments.
Figure 5:
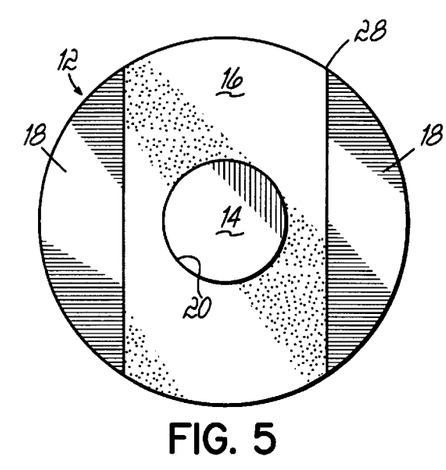
FIG. 5 is a two-pole powder metal rotor assembly of the present invention having a single magnetically conducting segment and two non-conducting segments.

FIGS. 4 and 5 depict embodiments of composite powder metal disks 12 for two-pole rotor assemblies of the present invention. In particular, the disk 12 of FIG. 4 has a plurality of alternating magnetically conducting segments 16 and non-conducting segments 18, and the disk 12 of FIG. 5 has a single magnetically conducting segment 16 adjacent the interior circumferential surface 20 of the disk 12 and extending to a portion of the exterior circumferential surface 28 of the disk 12, and two magnetically non-conducting segments 18 adjacent an exterior circumferential surface 28 of the disk 12. The shaft 14 for the disk 12 embodiment of FIG. 4 should have a magnetically conducting shaft.

Figure 6:
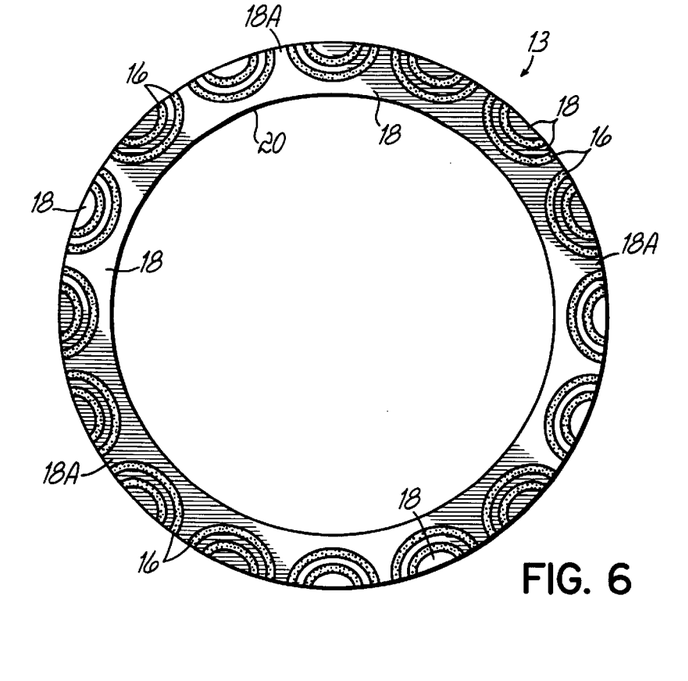
FIG. 6 is a sixteen-pole powder metal rotor assembly of the present invention comprising a ring having alternating magnetically conducting and non-conducting segments.

FIG. 6 depicts an embodiment of a high pole count composite powder metal ring 13, specifically a sixteen pole rotor, which could be used, for example, in an automotive integral starter motor-alternator. The ring 13 comprises a magnetically non-conducting segment 18 adjacent the interior circumferential surface 20 of the composite powder metal ring 13 and extending in arm-like portions 18A to the exterior circumferential surface 28. The ring 13 further comprises two essentially arcuate magnetically conducting segments 16 for each of the sixteen poles spaced around the ring 13, the segments 16 extending to the exterior circumferential surface 28 of the ring 13 between the arm-like portions 18A. Alternating magnetically non-conducting segments 18 separate the conducting segments 16 and likewise extend to the exterior circumferential surface 28 of the ring 13 between the arm-like portions 18A.

While FIGS. 1–6 depict various embodiments for two pole and four pole rotors, and a sixteen pole rotor, it should be appreciated that numerous other embodiments exist having between four and sixteen poles or having greater than sixteen poles, or having poles which are comprised of any number of alternating magnetically conducting and non-conducting segments. Thus, the invention should not be limited to the particular embodiments shown in FIGS. 1–6. It should be further understood that each embodiment described as a disk could be formed as a ring, which is generally understood to have a smaller annular width and larger inner diameter than a disk. Thus, the term disk used throughout the description of the invention and in the claims hereafter is hereby defined to include a ring. Further, the term disk includes solid disks. The aperture in the center of the disk that receives the rotor shaft may be later formed, for example, by machining.

The present invention further provides a method for fabricating composite powder metal disks or rings for assembling into a rotor for a synchronous reluctance machine. To this end, and in accordance with the principles of the present invention, a disk-shaped die is provided having discrete regions in a pattern corresponding to the desired rotor magnetic configuration. One or more discrete regions are filled with a soft ferromagnetic powder metal to ultimately form the magnetically conducting segments of the rotor, and one or more discrete regions are filled with non-ferromagnetic powder metal to ultimately form the magnetically non-conducting segments of the rotor. The discrete regions are filled such that the two powder metals are in alternating relation with each other to form the insulating and conducting paths for the rotor assembly. The powder metals are pressed in the die to form a compacted powder metal disk. This compacted powder metal is then sintered to form a single-piece powder metal disk or lamination having discrete regions of magnetically conducting and non-conducting materials of high structural stability. The pressing and sintering process results in magnetically conducting segments having a density of at least 95% of theoretical density and non-conducting segments having a density of at least 85% of theoretical density. The method for forming these rotors eliminates interior and exterior structural supports found in prior art synchronous reluctance rotor assemblies. The structural supports are not needed in the rotor assemblies of the current invention because the non-conducting material is self supporting and does not need the structural support nor does it need to suffer the flux leakage, power and efficiency loss associated with the cavity ends/structural supports.

In one embodiment of the present invention, the first and second regions in the die are filled concurrently with the two powder metals, which are then concurrently pressed and sintered. In another embodiment of the present invention, the two regions are filled sequentially with the powder metal being pressed and then sintered after each filling step. In other words, one powder metal is filled, pressed and sintered, and then the second powder metal is filled and the entire assembly is pressed and sintered.

The pressing of the filled powder metal may be accomplished by uniaxially pressing the powder in a die, for example at a pressure of about 45–50 tsi. It should be understood that the pressure needed is dependent upon the particular powder metal materials that are chosen. In a further embodiment of the present invention, the pressing of the powder metal involves heating the die to a temperature in the range of about 275° F. (135° C.) to about 290° F. (143° C.), and heating the powders within the die to a temperature about 175° F. (79° C.) to about 225° F. (107° C.).

In an embodiment of the present invention, the sintering of the pressed powder comprises heating the compacted powder metal to a first temperature of about 1400° F. (760° C.) and holding at that temperature for about one hour. Generally, the powder metal includes a lubricating material, such as a plastic, on the particles to increase the strength of the material during compaction. The internal lubricant reduces particle-to-particle friction, thus allowing the compacted powder to achieve a higher green strength after sintering. The lubricant is then burned out of the composite during this initial sintering operation, also known as a de-lubrication or delubing step. A delubing for one hour is a general standard practice in the industry and it should be appreciated that times above or below one hour are sufficient for the purposes of the present invention if delubrication is achieved thereby. Likewise, the temperature may be varied from the general industry standard if the ultimate delubing function is performed thereby. After delubing, the sintering temperature is raised to a full sintering temperature, which is generally in the industry about 2050° F. (1121° C.). During this full sintering, the compacted powder shrinks, and particle-to-particle bonds are formed, generally between iron particles. Standard industry practice involves full sintering for a period of one hour, but it should be understood that the sintering time and temperature may be adjusted as necessary. The sintering operation may be performed in a vacuum furnace, and the furnace may be filled with a controlled atmosphere, such as argon, nitrogen, hydrogen or combinations thereof. Alternatively, the sintering process may be performed in a continuous belt furnace, which is also generally provided with a controlled atmosphere, for example a hydrogen/nitrogen atmosphere such as 75% $H_2$/25% $N_2$. Other types of furnaces and furnace atmospheres may be used within the scope of the present invention as determined by one skilled in the art.

For the purposes of illustrating the method of the present invention, FIGS. 7–11C depict die inserts, hopper configurations and pressing techniques that may be used to achieve the concurrent filling or sequential filling of the powder metals and subsequent compaction to form the composite powder metal disks of the present invention. It is to be understood, however, that these illustrations are merely examples of possible methods for carrying out the present invention.

Figure 7:
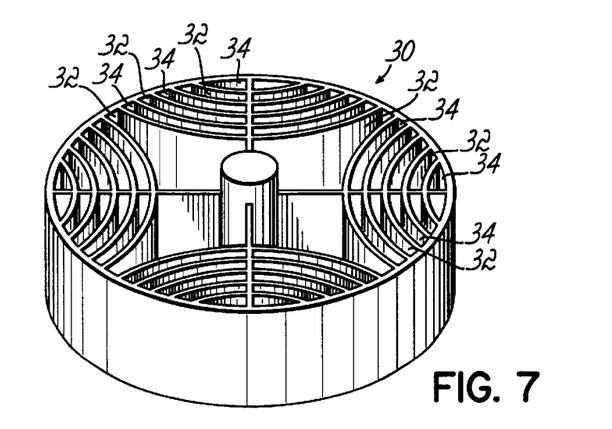
FIG. 7 is a perspective view of an insert for use in a method of the present invention.
Figure 8:
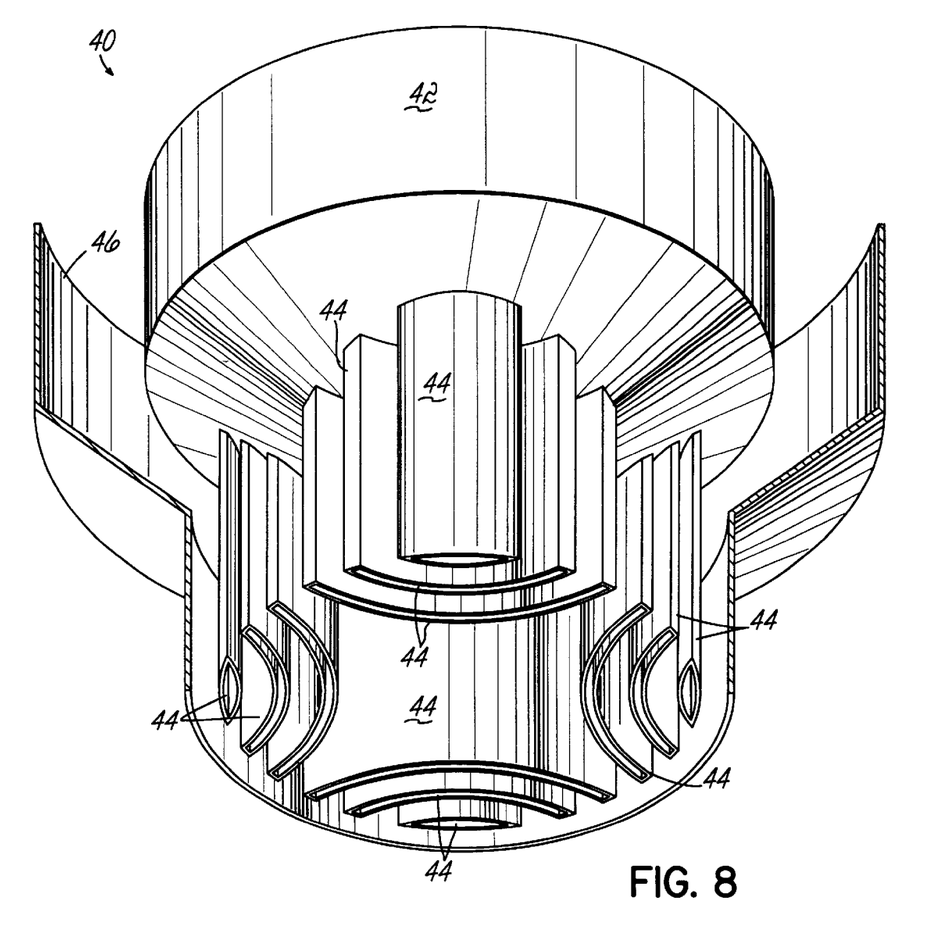
FIG. 8 is a perspective view of an inner bowl and outer bowl of a hopper that may be used for the filling aspect of the present invention.

FIG. 7 depicts a die insert 30 that may be placed within a die cavity to produce the powder metal disk 12 of FIG. 2. The two powder metals are filled concurrently or sequentially into the separate insert cavities 32,34, and then the insert 30 is removed. By way of example only, FIG. 8 depicts a hopper assembly 40 that may be used to fill the insert 30 of FIG. 7 with the powder metals. In this assembly 40, an inner bowl 42 is provided having arc tubes 44 for forming the generally arcuate segments 16,18 of the composite part or metal disk 12 of FIG. 2. This inner bowl 42 is adapted to hold and deliver one of the two powder metals. To produce the disk 12 of FIG. 2, the inner bowl 42 will deliver the non-ferromagnetic powder metal An outer bowl 46 is positioned around the inner bowl 42, with the outer bowl 46 adapted to hold and deliver the second powder metal. To produce the disk 12 of FIG. 2, the outer bowl 46 will deliver the ferromagnetic powder metal. This dual hopper assembly 40 enables either concurrent or sequential filling of the die insert of FIG. 7.

Figure 9A:
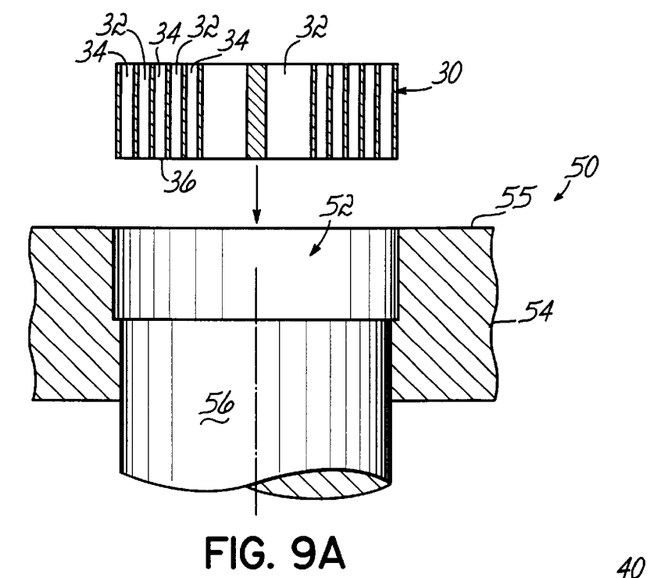
FIGS. 9A–9E are cross-sectional schematic views of a method of the present invention using the insert of FIG. 7 and the hopper of FIG. 8 to produce the rotor assembly of FIG. 2.
Figure 9B:
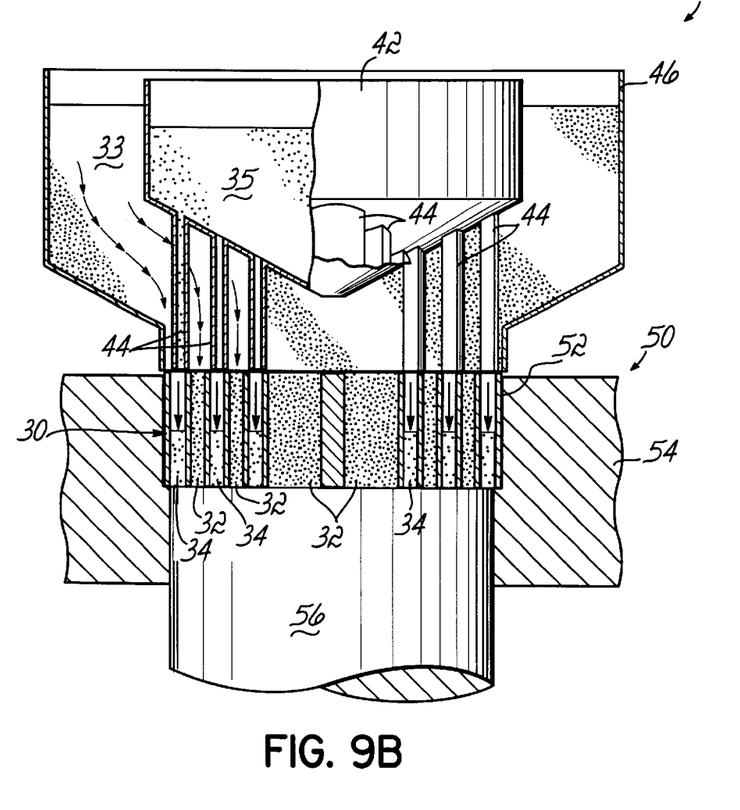
Figure 9C:
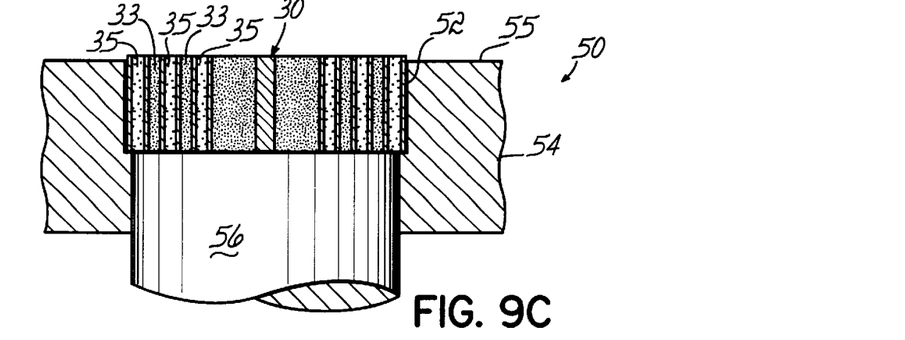
Figure 9D:
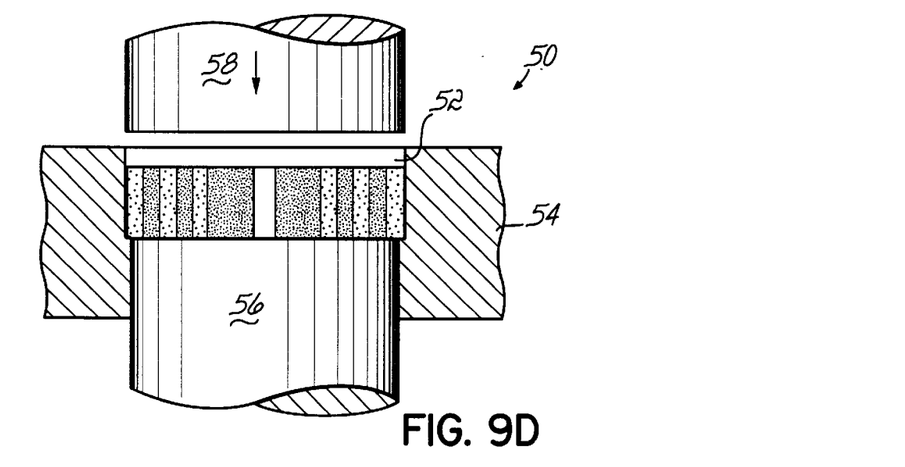
Figure 9E:
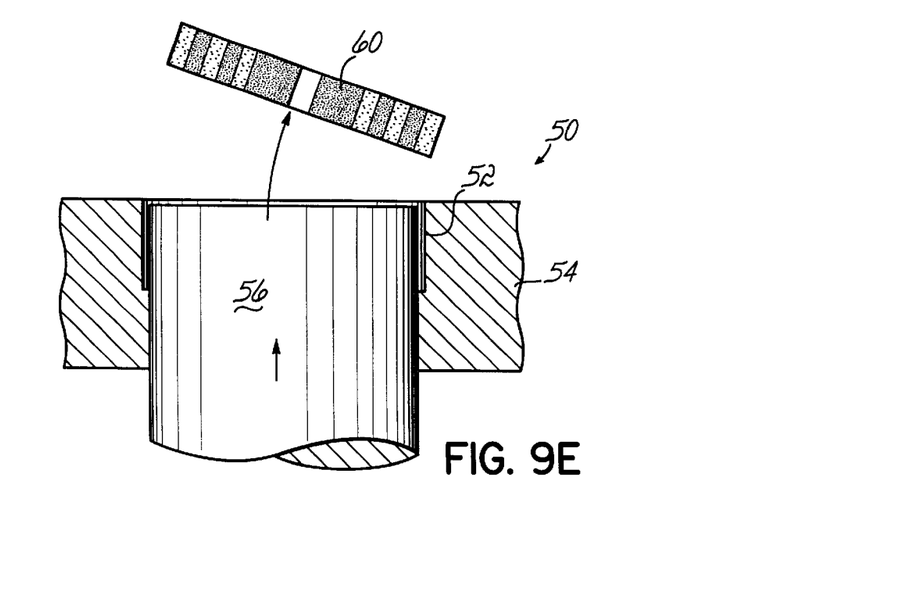

FIGS. 9A–9E depict schematic views in partial cross-section of how the die insert 30 of FIG. 7 and the hopper assembly 40 of FIG. 8 can be used with an uniaxial die press 50 to produce the composite powder metal disk 12 of FIG. 2. In this method, the insert 30 is placed within a cavity 52 in the die 54, as shown in FIG. 9A, with a lower punch 56 of the press 50 abutting the bottom 36 of the insert 30. The hopper assembly 40 is placed over the insert 30 and the powder metals 33,35 are filled into the insert cavities 32,34, concurrently or sequentially, as shown in FIG. 9B. The hopper assembly 40 is then removed, leaving a filled insert 30 in the die cavity 52, as shown in FIG. 9C. Then the insert 30 is lifted out of the die cavity 52, which causes some settling of the powder, as seen in FIG. 9D. The upper punch 58 of the press 50 is then lowered down upon the powder-filled die cavity 52, as shown by the arrow in FIG. 9D, to uniaxially press the powders in the die cavity 52. The final composite part 60 is then ejected from the die cavity 52 by raising the lower punch 56 and the part 60 transferred to a sintering furnace (not shown). Where the filling is sequential, the first powder is poured into either the inner bowl 42 or outer bowl 46, and a specially configured upper punch 58 is lowered so as to press the filled powder, and the partially filled and compacted insert (not shown) is sintered. The second fill is then effected and the insert 30 removed for pressing, ejection and sintering of the complete part 60.

Figure 10:
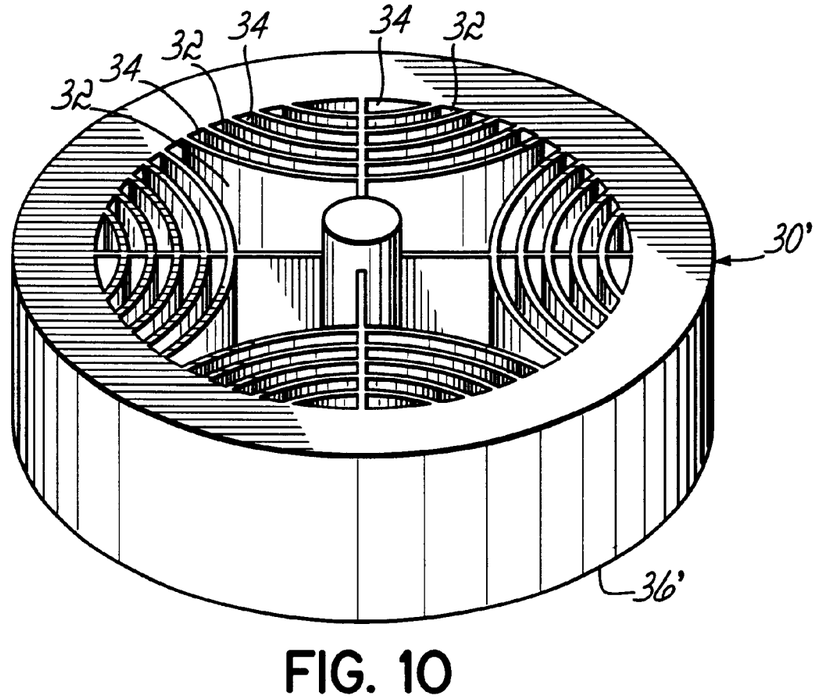
FIG. 10 is a perspective view of an insert for use in an alternative method of the present invention.
Figure 11A:
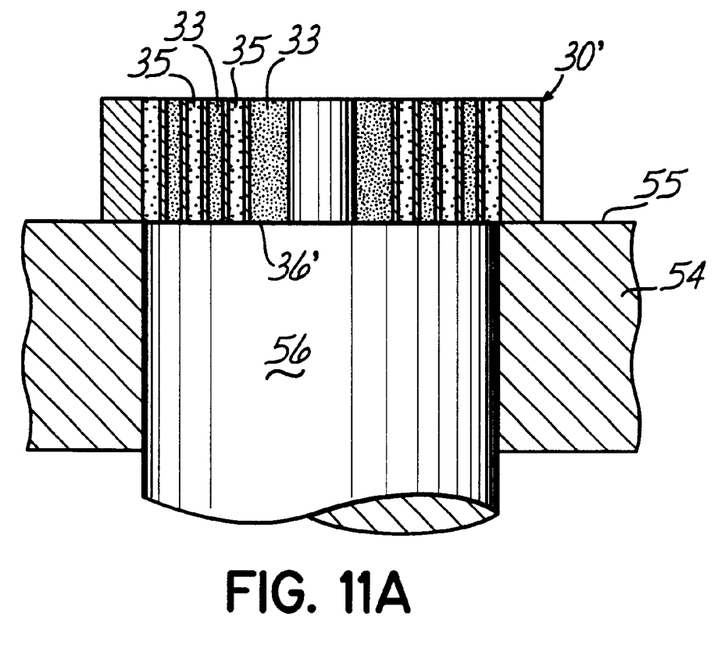
FIGS. 11A–11C are cross-sectional schematic views of the present invention using the insert of FIG. 10 and the hopper of FIG. 8 to produce the rotor assembly of FIG. 2.
Figure 11B:
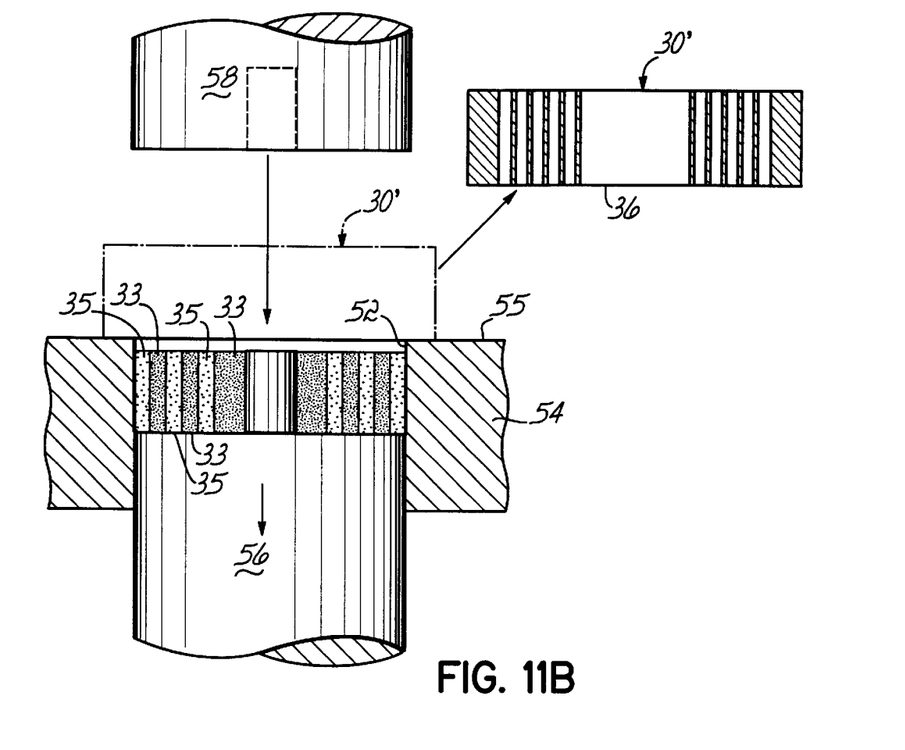
Figure 11C:
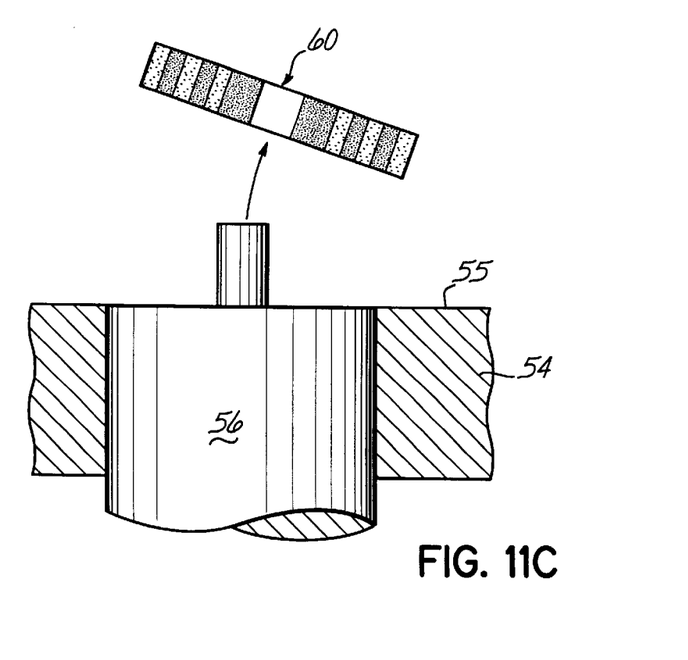

FIG. 10 depicts an alternative die insert 30' that may be placed on a top surface 55 of the die 54 over the die cavity 52 to again form the powder metal disk 12 depicted in FIG. 2. FIGS. 11A–11C show the method for using the insert 30' of FIG. 10. The insert is set on top surface 55 of the die 54 over the cavity 52 with the lower punch 56 in the ejection position, as shown in FIG. 11A. The powder metals 33,35 are then filled into the insert 30', either concurrently or sequentially, as shown in FIG. 9B, and the lower punch 56 is then lowered to the fill position. The lowering of the punch 56 forms a vacuum which pulls the powder metals 33,35 out of the bottom 36' of the insert 30' and into the die cavity 52, as shown in FIG. 11B. The insert 30' is then removed from the top surface 55 of the die 54, and the upper punch 58 is lowered into the die cavity 52 to compact the powder metals 33,35. The lower punch 56 is then raised to eject the final composite part 60, as shown in FIG. 11C, and the part 60 is then transferred to a sintering furnace (not shown). Where the filling is sequential, dummy placement segments (not shown) may be used for the first filling/pressing/sintering sequence which can then be removed to effect the filling of the second powder metal.

In one embodiment of the present invention, pneumatic air hammers or tappers (not shown) may be placed on, in, or around the inserts 30,30' used in either the method depicted in FIGS. 9A–9E or the method depicted in FIGS. 11A–11C. The vibrating of the insert 30,30' enables the powder metal 33,35 to flow out of the insert 30,30' with greater ease as the insert 30,30' is removed, and further enables a greater tap density. In another embodiment of the present invention, a dry lube is sprayed or added to the inside of the insert cavities 32,34 used in either of those methods. Again, this dry lube helps to improve the flow of the powder metals 33,35 out of the insert 30,30'. In yet another embodiment of the present invention, heaters and thermocouples (not shown) may be used in conjunction with the insert 30,30'. The heat keeps the powder warm, if warm compaction is being optimized, and again allows the powder metals 33,35 to more easily flow out of the insert 30,30'.

It should be further understood that while the methods shown and described herein are discussed with respect to forming a composite disk with an aperture in the center for receiving the shaft of a rotor assembly, the composite part may be formed as a solid disk, with the aperture being machined after compaction or sintering.

While the present invention has been illustrated by the description of embodiments thereof, and while the embodiments have been described in considerable detail, they are not intended to restrict or in any way limit the scope of the appended claims to such detail. Additional advantages and modifications will readily appear to those skilled in the art. For example, variations in the hopper assembly, filling method and die inserts may be employed to achieve a composite powder metal disk of the present invention, and variations in the magnetic configuration of the disks other than that shown in the Figures herein are well within the scope of the present invention. The invention in its broader aspects is therefore not limited to the specific details, representative apparatuses and methods and illustrative examples shown and described. Accordingly, departures may be made from such details without departing from the scope or spirit of applicant's general inventive concept.

What is claimed is:

1. A method of making a powder metal rotor for a synchronous reluctance machine, the method comprising:

filling a disk-shaped die in one or more discrete first regions with a soft ferromagnetic powder metal;

filling the die in one or more discrete second regions with a non-fenomagnetic powder metal, the discrete second regions in alternating relation with the discrete first regions;

pressing the soft ferromagnetic and non-ferromagnetic powder metals in the die to form a compacted powder metal disk; and sintering the compacted powder metal disk to form a composite powder metal disk having one or more magnetically conducting segments and one or more magnetically non-conducting segments.

2. The method of claim 1, wherein the first and second regions are filled concurrently.

3. The method of claim 1, wherein the first and second regions are filled sequentially with the powder metal being pressed and sintered after each filling step.

4. The method of claim 1, wherein the soft ferromagnetic powder metal is Ni, Fe, Co or an alloy thereof.

5. The method of claim 1, wherein the soft ferromagnetic powder metal is a high purity iron powder with a minor addition of phosphorus.

6. The method of claim 1, wherein the non-ferromagnetic powder metal is an austenitic stainless steel.

7. The method of claim 1, wherein the non-ferromagnetic powder metal is an AISI 8000 series steel.

8. The method of claim 1, wherein the pressing comprises uniaxially pressing the powder metals in the die.

9. The method of claim 1, wherein the pressing comprises pre-heating the powders powder metals and pre-heating the die.

10. The method of claim 1, wherein, after the pressing, the compacted powder metal disk is de-lubricated at a first temperature, followed by sintering at a second temperature greater than the first temperature.

11. The method of claim 1, wherein the sintering is performed in a vacuum furnace having a controlled atmosphere.

12. The method of claim 1, wherein the sintering is performed in a belt furnace having a controlled atmosphere.

13. The method of claim 1 further comprising stacking a plurality of the composite powder metal disks axially along a shaft to form a powder metal rotor assembly.

14. A method of making a powder metal rotor for a synchronous reluctance machine, the method comprising:
    filling a disk-shaped die in one or more discrete first regions with a soft ferromagnetic powder metal;
    pressing the soft ferromagnetic powder metal in the die to form one or more compacted magnetically conducting segments;
    sintering the compacted magnetically conducting segments;
    filling the die in one or more discrete second regions with a non-ferromagnetic powder metal, the discrete second regions in alternating relation with the discrete first regions; pressing the non-ferromagnetic powder metal in the die to form one or more compacted magnetically non-conducting segments; and
    sintering the compacted magnetically non-conducting segments and the compacted and sintered conducting segments to form a composite powder metal disk having one or more magnetically conducting segments and one or more magnetically non-conducting segments.

15. The method of claim 14, wherein the ferromagnetic powder metal is Ni, Fe, Co or an alloy thereof.

16. The method of claim 14, wherein the soft ferromagnetic powder metal is a high purity iron powder with a minor addition of phosphorus.

17. The method of claim 14, wherein the non-ferromagnetic powder metal is an austenitic stainless steel.

18. The method of claim 14, wherein the non-ferromagnetic powder metal is an AISI 8000 series steel.

19. The method of claim 14, wherein each pressing comprises uniaxially pressing the powder in the die.

20. The method of claim 14, wherein each pressing comprises pre-heating the powder and pre-heating the die.

21. The method of claim 14, wherein, after the pressing, the compacted segments are de-lubricated at a first temperature, followed by sintering at a second temperature greater than the first temperature.

22. The method of claim 14, wherein each sintering is performed in a vacuum furnace having a controlled atmosphere.

23. The method of claim 14, wherein each sintering is performed in a belt furnace having a controlled atmosphere.

24. The method of claim 14 further comprising stacking a plurality of the composite powder metal disks axially along a shaft to form a powder metal rotor assembly.

25. A method of making a powder metal rotor for a synchronous reluctance machine, the method comprising:
    concurrently filling a disk-shaped die in one or more first regions with a soft ferromagnetic powder metal and in one or more second regions with a non-ferromagnetic powder metal;
    concurrently pressing the soft ferromagnetic and non-ferromagnetic powder metals in the die to form a compacted powder metal disk; and
    sintering the compacted powder metal disk to form a composite powder metal disk having one or more magnetically conducting segments and one or more magnetically non-conducting segments.

26. The method of claim 25, wherein the soft ferromagnetic powder metal is Ni, Fe, Co or an alloy thereof.

27. The method of claim 25, wherein the soft ferromagnetic powder metal is a high purity iron powder with a minor addition of phosphorus.

28. The method of claim 25, wherein the non-ferromagnetic powder metal is an austenitic stainless steel.

29. The method of claim 25, wherein the non-ferromagnetic powder metal is an AISI 8000 series steel.

30. The method of claim 25, wherein the pressing comprises uniaxially pressing the powder metals in the die.

31. The method of claim 25, wherein the pressing comprises pre-heating the powder metals and pre-heating the die.

32. The method of claim 25, wherein, after the pressing, the compacted powder metal disk is de-lubricated at a first temperature, followed by sintering at a second temperature greater than the first temperature.

33. The method of claim 25, wherein the sintering is performed in a vacuum furnace having a controlled atmosphere.

34. The method of claim 25, wherein the sintering is performed in a belt furnace having a controlled atmosphere.

35. The method of claim 25 further comprising stacking a plurality of the composite powder metal disks axially along a shaft to form a powder metal rotor assembly.

* * * * *